(12) United States Patent
Hirano et al.

(10) Patent No.: US 8,543,735 B2
(45) Date of Patent: *Sep. 24, 2013

(54) SEMICONDUCTOR DEVICE AND DATA PROCESSING SYSTEM HAVING REDUCED NUMBER OF TERMINALS ALLOCATED FOR EXTERNALLY ACCESSED ADDRESS

(75) Inventors: Masaaki Hirano, Kanagawa (JP); Kunihiko Nishiyama, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,369

(22) Filed: Sep. 14, 2012

(65) Prior Publication Data

US 2013/0073831 A1 Mar. 21, 2013

Related U.S. Application Data

(63) Continuation of application No. 13/033,641, filed on Feb. 24, 2011, now Pat. No. 8,291,124.

(30) Foreign Application Priority Data

Feb. 24, 2010 (JP) ................................ 2010-038857

(51) Int. Cl.
*G06F 3/00* (2006.01)
*G06F 13/36* (2006.01)

(52) U.S. Cl.
USPC .............................................. 710/3; 710/308

(58) Field of Classification Search
None
See application file for complete search history.

(56) References Cited

U.S. PATENT DOCUMENTS

| | | | |
|---|---|---|---|
| 7,165,125 B2 * | 1/2007 | Lissel et al. | 710/22 |
| 2001/0034817 A1 | 10/2001 | Leenstra et al. | |
| 2004/0064746 A1 | 4/2004 | Nishimoto et al. | |
| 2010/0034034 A1 * | 2/2010 | Smith | 365/191 |
| 2011/0055453 A1 | 3/2011 | Bennett | |

FOREIGN PATENT DOCUMENTS

JP 2010-009612 A 1/2010

* cited by examiner

*Primary Examiner* — Hyun Nam
(74) *Attorney, Agent, or Firm* — Miles & Stockbridge P.C.

(57) ABSTRACT

There is provided a semiconductor device having a reduced number of external terminals allocated for address input to receive access from outside, while realizing a high-speed response to an access from outside. The semiconductor device employs, in order to allow other external devices to directly access resources it possesses in its own address space, in an external interface circuit, external terminals which input a part of the address signal required for access from outside, a supplementary register which supplements the upper portion of address information that has been input from the external terminals, a mode register accessible from outside, and an address control circuit which generates an address signal to access the address space in a form based on information input from the external terminals, required supplementary information, and mode information of the mode register.

17 Claims, 18 Drawing Sheets

FIG. 5

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| ACCADR (INTERNAL ADDRESS) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| ADRmux, ADR (EXTERNAL TERMINAL) | - | - | - | A A25 | A A24 | A A23 | A A22 | A A21 | A A20 | A A19 | A A18 | A A17 | A A16 | AD15 | AD14 | AD13 | AD12 | AD11 | AD10 | AD9 | AD8 | AD7 | AD6 | AD5 | AD4 | AD3 | AD2 | AD1 | AD0 | - |
| CMPL (REGISTER SUPPLEMENTARY INFORMATION) | 31 | 30 | 29 | 28 | 27 | - | - | - | - | - | - | - | - | - | - | - | - | - | - | - | - | - | - | - | - | - | - | - | - | - | - | - |

{ FIRST MODE / FIRST ADDRESS GENERATION FORM }

CMPL (INDICATES UPPER 5 BITS OF ADDRESS SUPPLEMENTARY REGISTER)

ADR (INDICATES 10 BITS OF EXTERNAL ADDRESS TERMINAL)

ADRmux (INDICATES 16 BITS OF TERMINAL EMPLOYING EXTERNAL ADDRESS DATA MULTIPLEXING)

FIG. 6

*INPUT STATUS OF ADDRESS INFORMATION IN SECOND MODE*

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ACCADR (INTERNAL ADDRESS) | | | | | | | | | | | | | | | | | | | | | | | | | | | | | | | | |
| ADRmux, ADR (EXTERNAL TERMINAL) | - | - | - | - | - | A25 | A24 | A23 | A22 | A21 | A20 | A19 | A18 | A17 | A16 | AD15 | AD14 | AD13 | AD12 | AD11 | AD10 | AD9 | AD8 | AD7 | AD6 | AD5 | AD4 | AD3 | AD2 | AD1 | AD0 | - |
| CMPL (REGISTER SUPPLEMENTARY INFORMATION) | - | - | - | - | - | - | - | - | - | - | - | - | - | - | - | - | - | - | - | - | - | - | - | - | - | - | - | - | - | - | - | - |

FIG. 7

<< WHEN A25 (EXTERNAL TERMINAL) IS "1" >>

SECOND ADDRESS GENERATION FORM

| ACCADR (INTERNAL ADDRESS) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ADRmux, ADR (EXTERNAL TERMINAL) | - | - | | | - | - | A25 | A24 | A23 | A22 | A21 | A20 | A19 | A18 | A17 | AD15 | AD14 | AD13 | AD12 | AD11 | AD10 | AD9 | AD8 | AD7 | AD6 | AD5 | AD4 | AD3 | AD2 | AD1 | AD0 | - |
| HARD DECODE | 0 | 1 | 0 | 0 | 0 | 0 | | | | | | | | | | | | | | | | | | | | | | | | | | |

{ UPPER ADDRESS 0X4******** INDICATES SDRAM SPACE }

FIG. 8

<< WHEN A25 (EXTERNAL TERMINAL) IS "0" >>

| ACCADR (INTERNAL ADDRESS) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ADRmux, ADR (EXTERNAL TERMINAL) | - | - | - | - | - | - | - | - | - | - | - | - | - | - | - | - | - | - | - | - | AD10 | AD9 | AD8 | AD7 | AD6 | AD5 | AD4 | AD3 | AD2 | AD1 | AD0 | - |
| HARD DECODE | * | * | * | * | * | * | * | * | * | * | * | * | * | * | * | * | * | * | * | * | - | - | - | - | - | - | - | - | - | - | - | - |

(THIRD ADDRESS GENERATION FORM)

{ ADDRESS VALUE IS NECESSARILY DETERMINED BY VALUES OF EXTERNAL TERMINALS AD13 TO AD11 }

FIG. 9

( INPUT OF ADDRESS INFORMATION IN THIRD MODE )

| ACCADR (INTERNAL ADDRESS) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ADRmux, ADR (EXTERNAL TERMINAL) | - | - | - | - | - | - | - | - | - | - | - | - | - | - | A16 | AD15 | AD14 | AD13 | AD12 | AD11 | AD10 | AD9 | AD8 | AD7 | AD6 | AD5 | AD4 | AD3 | AD2 | AD1 | AD0 | - |
| CMPL (REGISTER SUPPLEMENTARY INFORMATION) | - | - | - | - | - | - | - | - | - | - | - | - | - | - | 17 | - | - | - | - | - | - | - | - | - | - | - | - | - | - | - | - | - |

FIG. 10

<< WHEN A16 (EXTERNAL TERMINAL) IS "1" >>

[ADDRESS GENERATION FORM OF FOURTH MODE]

| ACCADR (INTERNAL ADDRESS) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ADRmux, ADR (EXTERNAL TERMINAL) | | | | | | | | | | | | | | | | | AD15 | AD14 | AD13 | AD12 | AD11 | AD10 | AD9 | AD8 | AD7 | AD6 | AD5 | AD4 | AD3 | AD2 | AD1 | AD0 |
| CMPL (REGISTER SUPPLEMENTARY INFORMATION) | - | - | - | - | 27 | 26 | 25 | 24 | 23 | 22 | 21 | 20 | 19 | 18 | 17 | - | - | - | - | - | - | - | - | - | - | - | - | - | - | - | - | - |
| HARD DECODE | 0 | 1 | 0 | 0 | 0 | | | | | | | | | | | | | | | | | | | | | | | | | | | |

{ UPPER ADDRESS 0X4******* INDICATES SDRAM SPACE }

FIG. 11

$\left\{\begin{array}{l}\text{FOURTH MODE}\\\text{SIXTH ADDRESS}\\\text{GENERATION FORM}\end{array}\right.$

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| ACCADR (INTERNAL ADDRESS) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| ADRmux, ADR (EXTERNAL TERMINAL) | - | AD0 | AD1 | AD2 | AD3 | AD4 | AD5 | AD6 | AD7 | AD8 | AD9 | AD10 | AD11 | AD12 | AD13 | AD14 | AD15 | - | - | - | - | - | - | - | - | - | - | - | - | - | - | - |
| CMPL (REGISTER SUPPLEMENTARY INFORMATION) | - | - | - | - | - | - | - | - | - | - | - | - | - | - | - | - | - | 17 | 18 | 19 | 20 | 21 | 22 | 23 | 24 | 25 | 26 | 27 | 28 | 29 | 30 | 31 |

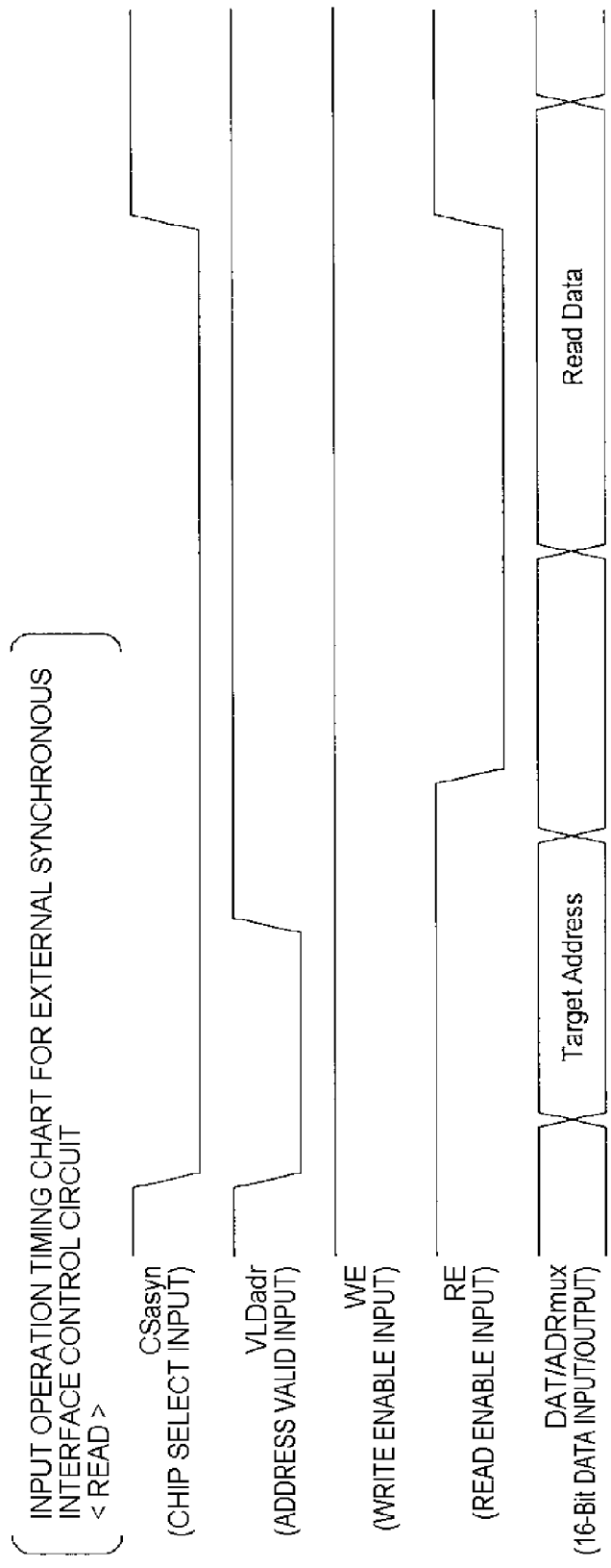

SEMICONDUCTOR DEVICE AND DATA PROCESSING SYSTEM HAVING REDUCED NUMBER OF TERMINALS ALLOCATED FOR EXTERNALLY ACCESSED ADDRESS

CROSS-REFERENCE TO RELATED APPLICATION

This application is a continuation of Application No. 13/033,641 filed Feb. 24, 2011. Also, the disclosure of Japanese Patent Application No. 2010-38857 filed on Feb. 24, 2010 including the specification, drawings and abstract is incorporated herein by reference in its entirety.

BACKGROUND OF THE INVENTION

The present invention relates to a semiconductor device that receives from outside an access request to an address space of a data processing unit, and further to a data processing system to which the semiconductor device is applied, and relates to a technology which can be effectively applied to a multiprocessor system, for example.

In a multiprocessor system where a plurality of processors is tightly coupled, it is possible to improve resource usage efficiency of one processor, thereby contributing to improvement in system efficiency and reduction in system cost by allowing the other processors to access resources provided in an address space of the one processor via the one processor. Japanese Patent Laid-Open No. 2010-9612 (Patent Document 1) discloses a technology of providing an interface means that allows one data processor to be coupled to another data processor, and providing the interface means with a function that allows other data processor to be coupled as a bus-master to an internal bus in one data processor, thereby allowing the other data processor to directly operate, from outside via the interface means, peripheral functions memory-mapped to the internal bus.

SUMMARY OF THE INVENTION

The inventors of the present invention have considered reducing the number of terminals that couple an external device to a processor, for allowing the external device to directly access resources owned by the processor. If a 32-Bit address signal, for example, is required to freely access an address space of a processor, it is often impossible to assign address terminals in a number equal to the number of bits to a connection for allowing the external device to access resources of the processor due to limitation of the number of external terminals. Patent Document 1 does not consider reduction of the number of terminals for such an external connection.

The present invention has been made in view of the above circumstances and provides a semiconductor device having a reduced number of external terminals allocated for address input to receive access from outside.

It is another object of the present invention to provide a semiconductor device having a reduced number of external terminals allocated for address input to receive access from outside, while realizing a high speed response to an access from outside.

Yet another object of the present invention is to provide a data processing system which can improve system efficiency in terms of resource usage efficiency and realize reduction of system cost in terms of a reduced number of external terminals for address input to receive access from outside.

The other purposes and the new feature of the present invention will become clear from the description of the present specification and the accompanying drawings.

The following explains briefly the outline of a typical invention among the inventions disclosed in the present application In other words, a semiconductor device employs, in order to allow other external devices to directly access resources it possesses in its own address space, in an external interface circuit, external terminals which input a part of the address signal required for access from outside, a supplementary register which supplements the upper portion of address information that has been input from the external terminals, a mode register accessible from outside, and an address control circuit which generates an address signal to respond to an access from outside in a form based on information input from the external terminals, required supplementary information, and mode information of the mode register.

Because the supplementary information that has been set in the supplementary register supplements the upper portion of the address information that has been input from an external terminal, a space wider than an address range determined by the number of bits of the external terminals can be accessed by an external terminal having a reduced number of bits. Because the address information can be supplemented using supplementary information which has been preliminarily set in the supplementary register, and because no processing is required in that case such as generating information to be supplemented by decoding some of the external terminals, delay of the address generation operation is small. Because the generation form of the address information can be determined using address information from the external terminal according to the setting of the mode register and the required supplementary information, many variations for the address generation form can be easily acquired by a small number of external terminals.

The following explains briefly the effect acquired by the typical invention among the inventions disclosed in the present application.

In other words, the number of external terminals allocated for address input to receive access from outside can be reduced, while realizing a high-speed response to an access from outside. Furthermore, it is possible to improve system efficiency in terms of resource usage efficiency and realize reduction of system cost in that the number of address input external terminals for receiving accesses from outside can be reduced.

BRIEF DESCRIPTION OF THE DRAWINGS

FIG. 5 is an explanatory drawing illustrating details of a first address generation form;

FIG. 6 is an explanatory drawing illustrating an address input state in a second mode (second address generation form and third address generation form);

FIG. 7 is an explanatory drawing illustrating details of a second address generation form;

FIG. 8 is an explanatory drawing illustrating details of the second address generation form;

FIG. 9 is an explanatory drawing illustrating an address input state in a third mode (fourth address generation form and fifth address generation form);

FIG. 10 is an explanatory drawing illustrating details of a fourth address generation form;

FIG. 11 is an explanatory drawing illustrating details of a sixth address generation form in a fourth mode;

FIG. 20 is a timing chart of a read operation on an external asynchronous interface control circuit.

DETAILED DESCRIPTION OF PREFERRED EMBODIMENTS

1. Outline of Embodiments

Figure 1:
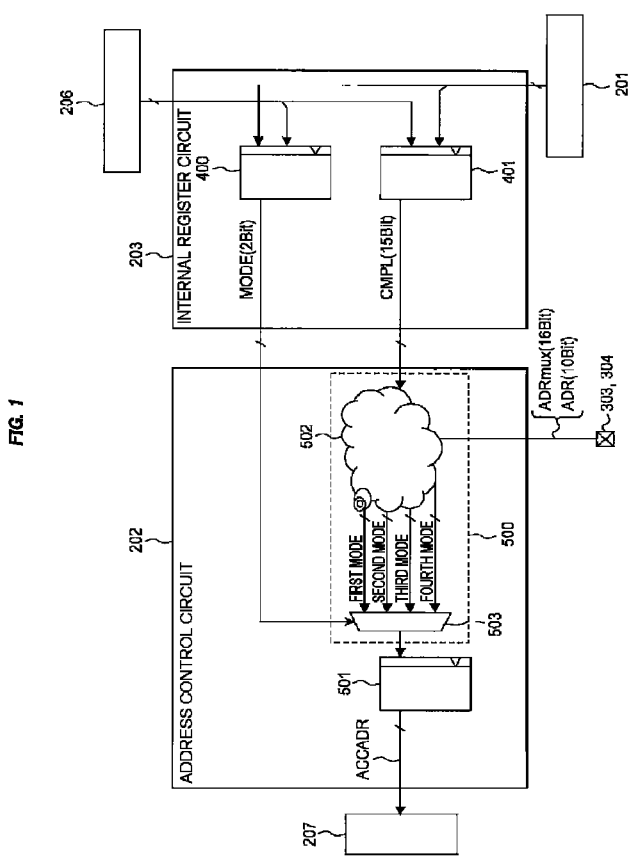
FIG. 1 is a block diagram illustrating the details of an address conversion mechanism according to an address control circuit and a register control circuit.

First, representative embodiments of the invention disclosed in this application are outlined. Reference numerals of the drawings which are referred to in parentheses in the outline explanation of the representative embodiments merely exemplify what are included in the concept of the components to which the numerals are provided.

[1] <Semiconductor Device>

A semiconductor device (2) according to a representative embodiment of the present invention comprises a data processing unit (100), and an external interface circuit (10) which controls access to an address space of the data processing unit from outside the semiconductor device. The external interface circuit comprises a plurality of external terminals (303,304) for inputting, from outside the semiconductor device, a part of an address signal used to access the address space, a supplementary register (401) in which supplementary information (complementary information) for supplementing an upper portion of address information that has been input from the external terminals is written from outside the semiconductor device, a mode register (400) in which mode information is written from outside the semiconductor device, and an address control circuit (202) which generates an address signal to access the address space in a form based on information input from the external terminal, required supplementary information, and mode information of the mode register.

Accordingly, because the supplementary information that has been set in the supplementary register supplements the upper portion of the address information that has been input from an external terminal, a space wider than an address range determined by the number of bits of the external terminals can be accessed by an external terminal having a reduced number of bits. Because the address information can be supplemented using supplementary information which has been preliminarily set in the supplementary register, and because in that case no processing is required such as generating information to be supplemented by decoding some of the external terminals, delay of the address generation operation is small. Because it is possible to determine the generation form of the address information using address information from the external terminal and the required supplementary information according to the setting of the mode register, many variations for the address generation form can be easily acquired by a small number of external terminals.

[2] <mode 1: Reg5bit, ADR10bit, MPX16bit>

In the semiconductor device of article 1, the generation form of the address signal by the address control circuit includes a first generation form (FIG. 5) which supplements the address information input from the external terminal by supplementary information (complement information) of the supplementary register.

Accordingly, address information is output to the external terminal and read or write access can be continuously performed, after having set the supplementary register.

[3] In the semiconductor device of article 2, the external terminals includes external multiplex terminals (303) and address input terminals (304) used for address data input or data input/output in a switching manner and, in the first generation form, address information is input using both the address input terminals and the multiplex terminals.

The number of external terminals can be further reduced by employing multiplex terminals.

[4] <Mode 2: ADR10bit, MPX15bit>

In any of the semiconductor devices of articles 1 to 3, the generation form of the address signal by the address control circuit includes a second generation form (FIGS. 6 and 7) in which, when particular bits (A25) of the address information input from the external input terminals are a first value, the address information from the external input terminals excluding the particular bits is defined as the lower portion and the upper portion is defined as a default value assigned to the address of a particular resource, and a third generation form (FIGS. 6 and 8) in which, when particular bits of the address information input from the external input terminals are a second value, a predetermined bit string of the address information from the external input terminal is defined as the lower portion and the upper portion is defined as a default value assigned to the address of a resource corresponding to the value of another particular bit array (AD13 to AD11) of the information input from the external input terminal.

The second generation form allows full access to a particular resource using an external terminal. The third generation form makes it possible to specify a resource in a predetermined range with a value of particular bit array of some of the external terminals and to fully access the specified resource using the rest of the bit array of the external terminals. Accordingly, it becomes possible to fully access a local address range of a predetermined resource using an external terminal having a limited number of bits.

[5] In the semiconductor device of article 4, the particular resource is a synchronous DRAM (9), and the resource corresponding to the value of the particular bit array is a group of registers (control registers 13 and 14).

[6] In the semiconductor device of article 4 or 5, the external terminals include external multiplex terminals and address input terminals used for address information input or data information input/output in a switching manner, all bits of both the address input terminals and the multiplex terminals are used to input information in the second generation form and the third generation form, the particular bit is a 1-Bit input of the address input terminals, and the predetermined bit string and another particular bit array are input from the external multiplex terminals.

[7] <Third mode: Reg10bit, ADR1bit, MPX>

In any of the semiconductor devices of articles 1 to 6, the generation form of the address signal by the address control circuit includes a fourth generation form (FIGS. 9 and 10) in which, when particular bits (A16) of the address information input from the external input terminals are a first value, the address information from the external input terminals excluding the particular bits is defined as the lower portion and the upper portion is defined as supplementary information held in the supplementary register with the upper portion further defined as a default value assigned to the address of a particular resource, and a fifth generation form (FIGS. 9 and 8) in which, when particular bits of the address information input from the external input terminals are a second value, a predetermined bit string of information from the external input terminals is defined as the lower portion and the upper portion is defined as a default value assigned to the address of a resource corresponding to the value of another particular bit array (AD13 to AD11) of the information input from the external input terminals.

The fourth generation form allows full access to a particular resource using external terminals and a supplementary register. The fifth generation form makes it possible to specify a resource in a predetermined range with a value of particular bit array of some of the external terminals and to fully access the specified resource using the rest of the bit array of the external terminals. Accordingly, it becomes possible to fully access a local address range of a predetermined resource using an external terminal having a limited number of bits. In comparison with the second mode, the number of external terminals used can be reduced.

[8] In the semiconductor device of article 7, the particular resource is a synchronous DRAM, and the resource corresponding to the value of the particular bit array is a group of registers.

[9] In the semiconductor device of article 7 or 8, the external terminals includes external multiplex terminals and address input terminals used for address input or data input/output in a switching manner, in which one bit of the address input terminals and all bits of the multiplex terminals are used to input information in the fourth generation form and the fifth generation form, in which the particular bit is a 1-Bit input of the address input terminal, and the predetermined bit string and another particular bit array are input from the external multiplex terminals.

[10] <Incrementer>

The semiconductor device of article 9 further comprises an incrementer (403) which increments the supplementary information of the supplementary register, an address increment control circuit (510) which provides the incrementer with an instruction of an increment operation whenever a value expressed by the number of bits of the address information from the multiplex terminals to be supplemented by the supplementary register in the fourth generation form reaches the last value immediately before the value goes around.

Accordingly, it becomes possible to continuously access a region that can be specified in the range of up to the sum of the number of bits of available external terminals and the number of bits of the supplementary register, without having to rewrite the value of the supplementary register from outside each time the address information input from some of the external terminals goes around. Therefore, it becomes possible to further reduce the number of the external terminals used and to continuously access an address range similar to that of the second generation form.

[11] <Increment Mode>

In the semiconductor device of article 10, the address increment control circuit issues the instruction of an increment operation in response to that the value of the address information from the external input terminal is set to the last value immediately before the final value expressed by the number of bits of the address information according to a multibyte address increment mode in which the address information from the external input terminal is varied in units of multibyte addresses.

Accordingly, it is possible to support a case having a bus control function for a burst operation of the 16-Byte address increment mode in which an external access entity issues an access request in units of 16-Byte addresses and the semiconductor device receiving the request internally generates a 16-Byte address with the access request address being the base point, or a case similarly having a bus control function for a burst operation of the 32-Byte address increment mode.

[12] <Increment Mode Register>The semiconductor device of article 11 further comprises an address increment mode register (402) which specifies the type of the address increment mode. The address increment control circuit switches, according to the type specified in the address increment mode register, the final value when instructing an address increment operation.

Accordingly, it becomes easier to support the 16-Byte address increment mode or the 32-Byte address increment mode.

[13] <Mode 4: Reg15bit, MPX>

In any of the semiconductor devices of articles 2 to 12, the generation form of the address signal by the address control circuit includes a sixth generation form (FIG. 11) in which the address information input from some of the external terminals with a smaller number of bits than that used in the first generation form is supplemented by supplementary information of the supplementary register having a larger number of bits than that used in the first generation form.

Accordingly, after having set the supplementary register, it is possible to output the address information to the external terminal and to perform read access or write access continuously. An effect similar to that of the first generation form can be realized using a reduced number of external terminals.

[14] In the semiconductor device of article 13, the external terminal to which the address information is input in the sixth generation form is an external multiplex terminal used for address input or data input/output in a switching manner.

[15] <Incrementer>

The semiconductor device of article 14 further comprises an incrementer which increments the supplementary information of the supplementary register, and an address increment control circuit which provides the incrementer with an instruction of an increment operation each time a value expressed by the number of bits of the address information from the multiplex terminal to be supplemented by the supplementary register in the sixth generation form reaches the last value immediately before the value goes around.

Accordingly, it becomes possible to continuously access a region that can be specified in the range of up to the sum of the number of bits of available external terminals and the number of bits of the supplementary register, without having to rewrite the value of the supplementary register from outside each time the address information input from some of the external terminals goes around. Therefore, it becomes possible to continuously access an address range similar to that of the second generation form even if the number of the external terminals used is further reduced.

[16] <Increment Mode>

In the semiconductor device of article 15, the address increment control circuit issues the instruction of an increment operation in response to that the value of the address information from the external input terminals is set to the last value immediately before the final value expressed by the number of bits of the address information according to a multibyte address increment mode in which the address information from the external input terminals is varied in units of multibyte addresses.

Accordingly, it is possible to support a case having a bus control function for a burst operation of the 16-Byte address increment mode in which an external access entity issues an access request in units of 16-Byte addresses and the semiconductor device receiving the request internally generates a 16-Byte address with the access request address being the base point, or a case similarly having a bus control function for a burst operation of the 32-Byte address increment mode.

[17] <Increment Mode Register>

The semiconductor device of article 16 further comprises an address increment mode register which specifies the type of the address increment mode. The address increment control circuit switches, according to the type specified in the address increment mode register, the final value when instructing an address increment operation.

Accordingly, it becomes easier to support the 16-Byte address increment mode or the 32-Byte address increment mode.

[18] <Data Processing System>

A data processing system (1) according to another embodiment of the present invention comprises a first data processor (2), a memory device (9) provided in a part of an address space of the first data processor and coupled to an outside of the first data processor, and a second data processor (3) coupled to an outside of the first data processor. The first data processor has a first external interface circuit (10) which controls access to the address space of the first data processor from the second data processor, and a second external interface circuit (11) which controls access to the memory device. The first external interface circuit has external terminals (303, 304) for inputting, from the second data processor, apart of the address signal used to access the address space, a supplementary register (401) in which supplementary information for supplementing the upper portion of the address information that has been input from the external terminals is written by the second data processor, a mode register (400) in which mode information is written by the second data processor, and an address control circuit (202) which generates an address signal to access the address space of the first data processor in a form based on information input from the external terminals, required supplementary information, and mode information of the mode register.

According to the first external interface circuit, because the supplementary information that has been set in the supplementary register supplements the upper portion of the address information that has been input from an external terminals, the second data processor can access a space wider than an address range determined by the number of bits of the external terminals of the first data processor by an external terminal having a reduced number of bits. Because the address information can be supplemented using supplementary information which has been preliminarily set in the supplementary register, and because in that case no processing is required for the first external interface circuit such as generating information to be supplemented by decoding some of the external terminals, delay of the address generation operation is small. Because the second data processor can determine the generation form of the address information using the address information from the external terminal and the required supplementary information according to the setting of the mode register in the first data processor, the first external interface circuit can easily acquire many variations for the address generation form by a small number of external terminals.

[19]

In the data processor of article 18, the second data processor outputs address information to the external terminal, after having set the mode register and the supplementary register, and issues read access or write access.

[20] <Mode 1: Reg5bit, ADR10bit, MPX16bit>

In the data processor of article 18 or 19, the generation form of the address signal by the address control circuit includes the first generation form which supplements the address information input from the external terminal with supplementary information of the supplementary register.

Accordingly, the second data processor, after having set the supplementary register, can output the address information to the external terminal and perform read access or write access continuously.

[21]

In the data processor of article 20, the external terminal includes an external multiplex terminal and an address input terminal used for address input or data input/output in a switching manner. In the first generation form, address information is input using both the address input terminal and the multiplex terminal.

[22] <Mode 2: ADR10bit, MPX15bit>

In any of the data processing systems of articles 18 to 21, the generation form of the address signal by the address control circuit includes a second generation form in which, when particular bits of the address information input from the external input terminals are a first value, the address information from the external input terminals excluding the particular bits is defined as the lower portion and the upper portion is defined as a default value assigned to the address of a particular resource, and a third generation form in which, when particular bits of the address information input from the external input terminals are a second value, a predetermined bit string of the address information from the external input terminals is defined as the lower portion and the upper portion is defined as a default value assigned to the address of a resource corresponding to the value of another particular bit array of the information input from the external input terminals.

The second generation form allows the second data processor to fully access a particular resource provided in the address space of the second data processor using external terminals. The third generation form allows the second data processor to specify a resource in a predetermined range provided in the address space of the second data processor with a value of particular bit array of some of the external terminals and to fully access the specified resource using the rest of the bit array of the external terminals. Accordingly, it becomes possible for the second data processor to fully access a local address range of a predetermined resource provided in the address space of the first data processor using an external terminal having a limited number of bits.

[23]

In the data processing system of article 22, the particular resource is the memory device, and the resource corresponding to the value of the particular bit array is a group of registers built in the first data processor.

[24]

In the data processing system of article 22 or 23, the external terminals includes external multiplex terminals and address input terminals used for address input or data input/output in a switching manner, in which all bits of both the address input terminals and the multiplex terminals are used to input information in the second generation form and the third generation form, the particular bit is a 1-Bit input of the address input terminal, and the predetermined bit string and another particular bit array are input from the external multiplex terminal.

[25] <The third Mode: Reg10bit, ADR1bit, MPX>

In any of the data processing systems of articles 18 to 24, the generation form of the address signal by the address control circuit includes a fourth generation form in which, when particular bits of the address information input from the external input terminal are a first value, the address information from the external input terminal excluding the particular bits is defined as the lower portion and the upper portion is defined as supplementary information held in the supplementary register with the upper portion further defined as a default value assigned to the address of a particular resource, and a fifth generation form in which, when particular bits of the address information input from the external input terminal are a second value, a predetermined bit string of information from the external input terminal is defined as the lower portion and the upper portion is defined as a default value assigned to the address of a resource corresponding to the value of another particular bit array of the information input from the external input terminal.

The fourth generation form allows the second data processor to fully access a particular resource provided in the address space of the first data processor using an external terminal and a supplementary register. The fifth generation form allows the second data processor to specify a resource in a predetermined range provided in the address space of the first data processor with a value of particular bit array of some of the external terminals and to fully access the specified resource using the rest of the bit array of the external terminals. Accordingly, it becomes possible for the second data processor to fully access a local address range of a predetermined resource provided in the address space of the first data processor using an external terminal having a limited number of bits. In comparison with the second mode, the number of external terminals used can be reduced.

[26]

In the data processing system of article 25, the particular resource is the memory device, and the resource corresponding to the value of the particular bit array is a group of registers built in the first data processor.

In the data processing system of article 25 or 26, the external terminal includes an external multiplex terminal and an address input terminal used for address input or data input/output in a switching manner, in which one bit of the address input terminal and all bits of the multiplex terminal are used to input information in the fourth generation form and the fifth generation form, the particular bit is a 1-Bit input of the address input terminal, and the predetermined bit string and another particular bit array are input from the external multiplex terminal.

[28] <Incrementer>

The data processing system of article 27, further comprises an incrementer which increments the supplementary information of the supplementary register, and an address increment control circuit which provides the incrementer with an instruction of an increment operation each time a value expressed by the number of bits of the address information from the multiplex terminal to be supplemented by the supplementary register in the fourth generation form reaches the last value immediately before the value goes around.

Accordingly, it becomes possible for the second data processor to continuously access a region that can be specified in the range of up to the sum of the number of bits of available external terminals and the number of bits of the supplementary register, without having to rewrite the value of the supplementary register of the first data processor each time the address information input from some of the external terminals goes around. Therefore, it becomes possible to further reduce the number of the external terminals used for transmitting address information between the first data processor and the second data processor, and to continuously access an address range similar to that of the second generation form.

[29] <Increment Mode>

In the data processing system of article 28, the address increment control circuit issues the instruction of an increment operation in response to that the value of the address information from the external input terminal is set to the last value immediately before the final value expressed by the number of bits of the address information according to a multibyte address increment mode in which the address information from the external input terminal is varied in units of multibyte addresses.

Accordingly, it is possible to support a case having a bus control function for a burst operation of the 16-Byte address increment mode in which the second data processor issues an access request in units of 16-Byte addresses and the first data processor receiving the request internally generates a 16-Byte address with the access request address being the base point, or a case similarly having a bus control function for a burst operation of the 32-Byte address increment mode.

[30] <Increment Mode Register>

The data processing system of article 29, further comprises an address increment mode register which specifies the type of the address increment mode. The address increment control circuit switches, according to the type specified in the address increment mode register, the final value when instructing an address increment operation.

Accordingly, it becomes easier to support the 16-Byte address increment mode or the 32-Byte address increment mode

[31] <Mode 4: Reg15bit, item MPX>

In any of the data processing systems of articles 20 to 30, the generation form of the address signal by the address control circuit includes a sixth generation form in which the address information input from some of the external terminals with a smaller number of bits than that used in the first generation form is supplemented by supplementary information of the supplementary register having a larger number of bits than that used in the first generation form.

Accordingly, after having set the supplementary register of the first data processor, the second data processor can output the address information to the external terminal and perform read access or write access continuously. An effect similar to that of the first generation form can be realized using a reduced number of external terminals.

In the data processing system of article 31, the external terminal to which the address information is input in the sixth generation form is an external multiplex terminal used for address input or data input/output in a switching manner.

[33] <Incrementer>

The data processing system of article 32 further comprises an incrementer which increments the value of the supplementary register, and an address increment control circuit which provides the incrementer with an instruction of an increment operation each time a value expressed by the number of bits of the address information from the multiplex terminal to be supplemented by the supplementary register in the sixth generation form reaches the last value immediately before the value goes around.

Accordingly, it becomes possible for the second data processor to continuously access a region that can be specified in the range of up to the sum of the number of bits of available external terminals and the number of bits of the supplementary register, without having to rewrite the value of the supplementary register of the first data processor each time the address information input from some of the external terminals goes around. Therefore, it becomes possible to continuously access an address range similar to that of the second generation form even if the number of the external terminals used for transmitting address information between the first data processor and the second data processor is further reduced.

[34] <Increment Mode>

In the data processing system, of article 33, the address increment control circuit issues the instruction of an increment operation in response to that the value of the address information from the external input terminal is set to the last value immediately before the final value expressed by the number of bits of the address information according to a multibyte address increment mode in which the address information from the external input terminal is varied in units of multibyte addresses.

Accordingly, it is possible to support a case having a bus control function for a burst operation of the 16-Byte address increment mode in which the second data processor issues an access request in units of 16-Byte addresses and the first data processor receiving the request internally generates a 16-Byte address with the access request address being the base point, or a case similarly having a bus control function for a burst operation of the 32-Byte address increment mode.

[35] <Increment Mode Register>

The data processing system of article 34 further comprises an address increment mode register which specifies the type of the address increment mode, and the address increment control circuit switches, according to the type specified in the address increment mode register, the final value when instructing an address increment operation.

Accordingly, it becomes easier to support the 16-Byte address increment mode or the 32-Byte address increment mode.

2. Details of Embodiments

Further details of the embodiments are provided below.

<<Data Processing System>>

Figure 2:
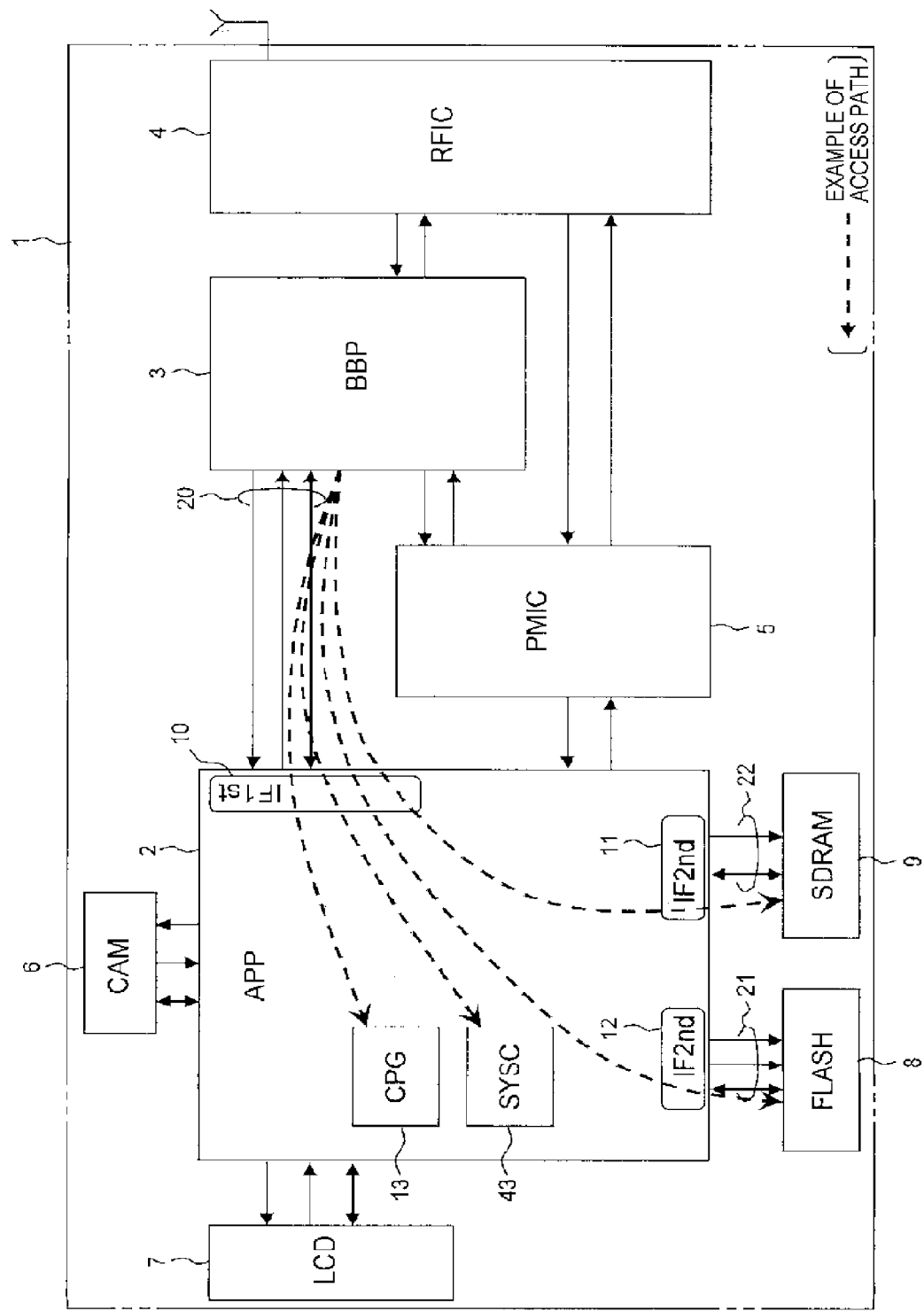
FIG. 2 is a block diagram illustrating a cellular phone device as an example of data processing system according to the present invention.

FIG. 2 illustrates a cellular phone device as an example of data processing system according to the present invention. The cellular phone device has a high-frequency transceiver (RFIC) 4, where the high-frequency transceiver 4 drives an antenna to transmit transmission data encoded by protocol control of a base band processor (BBP) 3, and the base band processor 3 decodes signals received by the high-frequency transceiver 4 via the antenna into received data according to predetermined protocol control. The base band processor 3 constitutes a single data processor or microcomputer comprising a central processing unit or a memory that executes instructions to perform protocol control of transmission and reception, authentication of telephone communication, or the like.

The base band processor 3 constitutes, together with an application processor (APP) 2 being another data processor, a multiprocessor system. APP2, BBP3, and RFIC4, configured as separate semiconductor devices respectively, are separately generated on a single semiconductor substrate such as monocrystal silicon by supplementary MOS integrated circuit manufacturing technology or the like. A power supply circuit (PMIC) 5 is a power supplying semiconductor device which supplies operation power to BBP3, APP2 and RFIC4.

An application processor 2, having a central processing unit which executes instructions, performs data processing such as image processing or encryption on data to be transmitted or received, display and drawing control on a liquid crystal display (LCD) 7, or interface control with a camera (CAM) 6. Although not particularly limited, external bus interface control of the base band processor 3 is performed by external interface circuits (IF2nd) 11 and 12 which perform interface control with a memory device represented by a synchronous DRAM (SDRAM) and an electrically rewritable nonvolatile memory (FLASH), and an external interface circuit (IF1st) 10 coupled to the base band processor 3.

The external interface circuit 11, having a control function in compliance with a memory interface specification of the SDRAM such as the so-called SDRAM controller, is coupled to SDRAM 9 via an external bus 22. The external interface circuit 12, having a control function in compliance with an interface specification couplable to a flash memory or SRAM, is coupled to a flash memory 8 via an external bus 21, for example.

An external interface circuit 10 allows the base band processor 3 to directly access a resource provided in the address space of the application processor 2 via the application processor 2. For example, the base band processor 3 accesses a memory device such as an SDRAM 9 or a FLASH 8 via the external interface circuits 11 and 12, and allows access to a group of registers such as a control register of a clock pulse generator (CPG) of the application processor 2 and a control register of a system controller (SYSC). Reference numeral 20 indicates an external bus which couples the base band processor 3 to the external interface circuit 12. Focusing on the interface function of the external interface circuit 10, the base band processor 3 can be positioned as a master processor, and the application processor 2 as a slave processor. In this sense, the external interface circuit 10 is also denoted as a master interface circuit 10 for the slave processor. The external interface circuits 11 and 12 are also simply denoted as external bus interface circuits.

<<Application Processor>>

Figure 3:
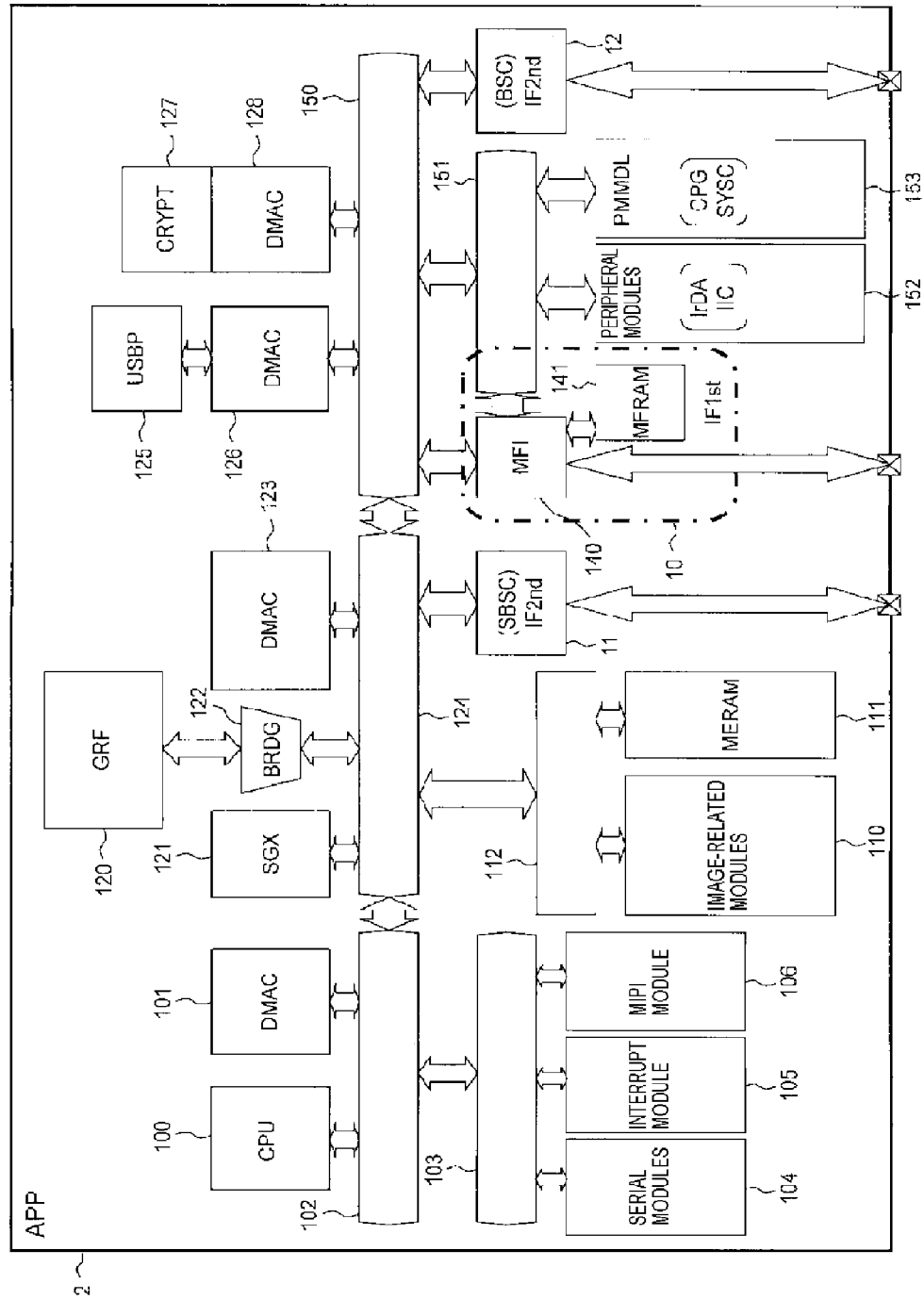
FIG. 3 is a block diagram illustrating a specific configuration of an application processor.

FIG. 3 illustrates a specific configuration of the application processor 2.

The application processor 2, which comprises a central processing unit (CPU) 100 in charge of the entire control, also comprises, as accelerators for the CPU 100, an audio processing accelerator (SGX) 121, an image processing accelerator (GRF) 120, a serial communication accelerator (USBP) 125, and an encryption/decryption processing accelerator (CRYPT) 127.

An internal bus 102 to which the CPU 100 is coupled has a direct memory access controller (DMAC) 101 coupled thereto and a peripheral bus 103 interfaced therewith, and the peripheral bus 103 has serial modules 104, an interrupt module 105 such as an interrupt controller, and a mobile device high-speed serial interface (MIPI) module 106 coupled thereto as peripheral modules of the CPU 100.

The accelerator 121 is coupled to an internal bus 124 which is interfaced with the internal bus 102, and to the internal bus 124 the accelerator 120 is coupled via a bus bridge, and also a DMAC 123 is coupled thereto. The internal bus 124 has an image processing bus 112 interfaced therewith, and the image processing bus 112 has an image-related module 110 for brightness adjustment and an image memory (MERAM) 111 coupled thereto. The internal bus 124 further has an SDRAM controller (SBSC) coupled thereto, for example, as the external interface circuit 11.

The accelerators 125 and 127 are interfaced with an internal bus 150 via specific DMACs 126 and 128, respectively, and the internal bus 150 is interfaced with the internal bus 124, as well as a lower peripheral bus 151. To the peripheral bus 151, peripheral modules 152 such as an infrared communication module (IrDA) and a serial interface module (IIC) and a power management module 153 such as a CPG13 and a SYSC14 are coupled.

Furthermore, to the internal bus 150, for example, a bus state controller (BSC) is coupled as the external bus interface circuit 12, and also a master interface circuit (IF1st) 10, which is coupled to the base band processor 3, is coupled thereto. The master interface circuit 10 includes an address conversion circuit (MFI) 140 and a shared memory (MFRAM) 141.

<<Master Interface Circuit>>

Figure 4:
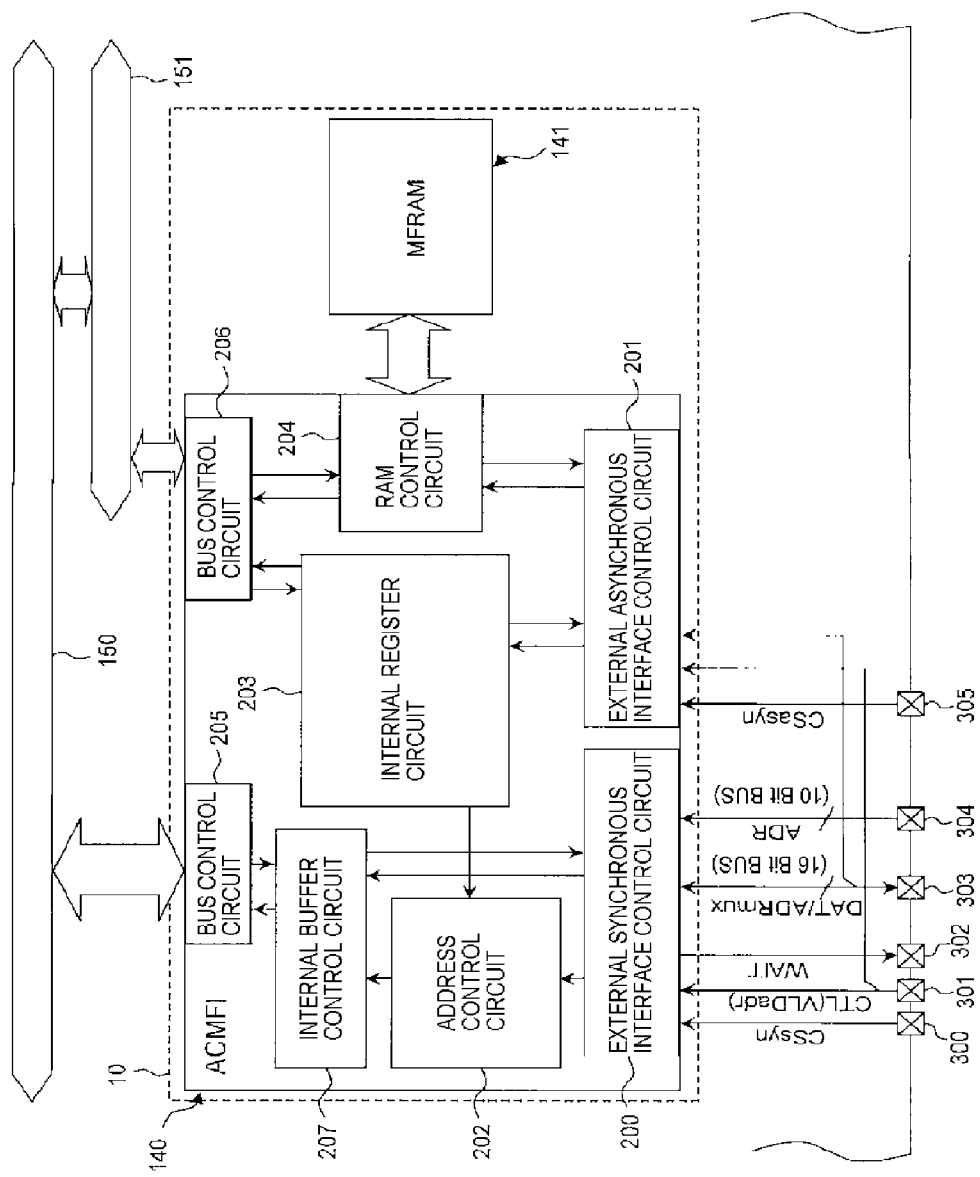
FIG. 4 is a block diagram illustrating a specific example of a master interface circuit.

FIG. 4 illustrates a specific example of the master interface circuit 10. An address conversion circuit 140 of the master interface circuit 10 has a bus control circuit 205 which interfaces with the internal bus 150 and a bus control circuit 206 which interfaces with the internal bus 151, and is coupled to the outside of a chip via an external synchronous interface control circuit 200 and an external asynchronous interface control circuit 201.

The master interface circuit 10 has, as external terminals of the chip coupled thereto, a terminal 300 for inputting a synchronous interface chip select signal (CSsyn), a plurality of multiplex terminals 303 for an address signal (ADRmux) and data (DAT), an input terminal 301 of a bus control signal (CLT) such as an address valid signal (VLDadr) indicating that inputs from the multiplex terminals 303 are address inputs, an output terminal 302 of a wait signal (WAIT), a plurality of input terminals 304 of an address signal (ADR), and a terminal 305 for inputting an asynchronous interface chip select signal (CSasyn). The multiplex terminals 303 have 16 bits and the address input terminals 304 have 10 bits.

The external synchronous interface control circuit 200 has the external terminals 300 to 304 coupled thereto, and an operation of the external synchronous interface control circuit 200 is selected by activation of the synchronous interface chip select signal (CSsyn) to acquire the address signal (ADRmux) and the address signal (ADR) from the terminals 303 and 304, and to input or output the data signal (DAT) according to the bus control signal (CLT). The address signal (ADRmux) and the address signal (ADR) from the external terminals 303 and 304 are supplied to an address control circuit 202, and the data (DAT) output to or input from the external terminals 303 is exchanged with an internal buffer control circuit 207. Referring to the control data set in an internal register circuit (a register circuit, an internal register control circuit) 203, the address control circuit 202 generates an internal address signal of the address space of the application processor 2 from the input address signal (ADRmux) and the address signal (ADR), and transfers the generated internal address signal to the internal buffer control circuit 207, where an access request is issued to the bus control circuit 205. The bus control circuit 205, to which the access request has been issued, issues a necessary bus request command to the bus 150 to control the bus access. If the bus access is a read access, the bus control circuit 205 receives data which has been read from a target specified by an internal address signal included in the bus command, and outputs the received read-data from the terminals 303 as data (DAT) via the external synchronous interface control circuit 200 by the control of the internal buffer control circuit 207. If the bus access is a write access, write data is written into a target specified by an internal address signal included in the bus command.

The external asynchronous interface control circuit 201 has external terminals 301, 303, and 305 coupled thereto, and an operation of the external asynchronous interface control circuit 201 is selected by activation of an asynchronous interface chip select signal (CSasyn) to acquire an address signal (ADRmux) from the terminals 303 according to a bus control signal (CLT), and to input or output the data (DAT). When the address signal (ADRmux) from the external terminals 303 specifies the address of a shared memory 141, a RAM control circuit 204 performs access control of the shared memory 141 based thereon. When the address specifies the address of the internal register circuit 203, the register specified by the address is accessed and control data for address conversion is set. The internal register circuit 203 and the shared RAM 141 can be similarly accessed from the internal bus 150 via the bus control circuit 206. Therefore, initial setting or the like of the control data of address conversion can be also performed by the base band processor 3.

<<Address Conversion>>

FIG. 1 illustrates the details of the address conversion mechanism according to the address control circuit 202 and the internal register circuit 203. The register circuit 203 has, for example, the supplementary register 401 and the mode register 400. The supplementary register 401 has supplementary information (up to 15 bits, for example) CMPL written therein from outside the application processor 2 via the interface circuit 201 or the like to supplement the upper portion of the address information input from the address terminals 304 and the multiplex terminals 303. The mode register 400 has, for example, a 2-Bit mode data MODE written therein from outside the application processor 2 via the interface circuit 201 or the like.

The address control circuit 202 comprises an address generation logic circuit 500 which generates an internal address signal to access the address space of the application processor 2 in an address generation form based on the address information ADRmux from the external terminals 303, the address information ADR from the external terminals 304, required supplementary information CMPL held in the supplementary register 401, and mode information MODE of the mode register 400, and the internal address signal generated in the address generation logic circuit 500 is latched by an address latch 501 and supplied to the internal buffer control circuit 207. Although not particularly limited, the address generation logic circuit 500 is illustrated as including a logic circuit 502 and a selector 503 for convenience.

Address generation forms are broadly classified into first to fourth modes specified by a 2-Bit mode data, where the second mode and the third mode are respectively subdivided into two aspects according to the value of particular bits of the address information ADRmux.

The first mode supplements 5 bits of the upper address of an internal address signal ACCADR by the supplementary register 401, and generates the internal address signal ACCADR using the address from the external terminals 303 and 304 as its lower address without change. Such an address generation form is also denoted as a first address generation form.

The second mode performs hardware decoding on a part of the address from the external terminals 303 and 304 without using supplement by the supplementary register 401 and generates an internal address signal according to the result of decoding. The address generation form by the second mode is roughly classified into a second address generation form and a third address generation form according to the manner the hardware decoding is performed.

The third mode supplements the upper 10 bits of the internal address signal ACCADR by the supplementary register 401, performs hardware decoding on one bit of the external terminals 304 and a part of the address from the external terminals 304, and generates an internal address signal according to the result of decoding. The address generation form by the third mode is roughly classified into a fourth address generation form and a fifth address generation form according to the manner the hardware decoding is performed.

The fourth mode supplements the upper 15 bits of the internal address signal ACCADR by the supplementary register 401 and generates the internal address signal ACCADR using the address from the external terminals 303 and 304 as its lower address without change. Such an address generation form is also denoted as a sixth address generation form.

FIG. 5 illustrates the details of the first address generation form.

Because the internal address information ACCADR of the application processor 2 includes a total of 32 bits from the address bit 0 to the address bit 31 and the minimum word data of an internal bus includes 16 bits, the address bit 0 is ignored for convenience. AD0 to AD15 indicate the bits of the 16-Bit address information of the multiplex terminals 303 and A16 to A25 indicate 10-Bit address bits of the address terminals 304.

In order to use the first address generation form, it is needless to say that 10 bits of the address terminals 304 and 15 bits of the multiplex terminals 303 from outside must be coupled to corresponding terminals of the base band processor 3. The upper 5 bits of the address are supplemented by 5 bits of the supplementary information CMPL.

By setting once a continuous address space, i.e., the supplementary register 401 by the external address signal ACCADR generated as described above, the address space that can be continuously expressed by the external address information only is 128 Mega Bytes (MBytes). Therefore, the base band processor 3 can continuously access 128 MBytes of the SDRAM 9 provided in the address space of the application processor 2.

FIG. 6 illustrates an address input state in the second mode (the second address generation form and the third address generation form). Address information and an address are input using 26 bits of the external address terminals 303 and 304 without using the supplementary register 401, hardware-based address decoding is performed on inputs of particular bit A25, and AD11 to AD13 from outside, and the internal address signal ACCADR is generated referring to the result of decoding.

FIG. 7 illustrates the details of the second address generation form.

Resources desired by the base band processor 3 to access (the application processor 2 can admit access) are basically limited. Therefore, in order to automatically generate the particular internal address signal ACCADR based on insufficient address information from outside, hardware decoding is performed on particular bits. In the second mode, the second address generation form or the third address generation form is selected according to the logic value of the bit A25 of the external terminal 304. If the address bit A25 is "1", the internal address signal ACCADR is generated with a bit specifying the address space of the SDRAM inserted in the upper bits (second address generation form) and, if the address bit A25 is "0", the internal address signal ACCADR is generated with a bit specifying the internal register space inserted in the upper portion according to the values of the address bits AD13 to AD11 (third address generation form).

In FIG. 7, which illustrates a case where the address bit A25 (external terminal) is "1" in the second mode (second address generation form), up to the bit 25 of the internal address signal ACCADR can be specified by the external address terminals 303 and 304, with the upper bits 31 to 26 thereof indicating the mapping address of the SDRAM. In this case, the continuous space of the SDRAM accessible by the 25 bits of A24 to A16 and AD15 to AD0 of the external address terminals 303 and 304 become 64 MBytes.

FIG. 8 illustrates the details of the second address generation form. If the address bit A25 (external terminal) is "0" in the second mode (third address generation form), the upper portion of the internal address signal ACCADR is determined by the values of AD13 to AD11 of the external address terminals in a fixed manner. For example, it is set to the control register region of CPG13 (0xE6350*) if AD13 to AD11="000", and set to the control register region of SYSC14 (0xE6380*) if AD13 to AD11="001". The lower address of the register region whose upper portion has been determined can be thereby arbitrarily specified by the values of the external terminals AD10 to AD0. In other words, the lower address can be directly specified from 0x***000 to 0x***FFF, referred to from the external terminals, and a region of 4 Kilo Bytes (KBytes) can be freely accessed.

FIG. 9 illustrates an address input state in the third mode (fourth address generation form and fifth address generation form). As well as using 10 bits of the supplementary register 401, address information and an address are input using one bit of the address terminal 304 and 16-Bit multiplex terminals 304, hardware-based address decoding is performed on inputs of particular bits of A16, and AD11 to AD13 from outside, and the internal address signal ACCADR is generated referring to the result of decoding.

FIG. 10 illustrates the details of the fourth address generation form.

Hardware decoding is performed on particular bits for a reason similar to that of the second mode. In the fourth mode, the fourth address generation form or the fifth address generation form is selected according to the logic value of the bit A16 of the external terminal 304. If the address bit A16 is "1", the internal address signal ACCADR is generated with a bit specifying the address space of the SDRAM inserted in the upper bits (fourth address generation form) and, if the address bit A16 is "0", the internal address signal ACCADR is generated with a bit specifying the internal register space inserted in the upper portion according to the values of the address bits AD13 to AD11 (fifth address generation form). The difference from the second mode (second address generation form, third address generation form) lies in that supplement is also possible by the number of reference bits of the external terminals 304 and the supplementary register 401. The address supplement becomes effective when the address bit A16 is "1", that is, when the internal address signal ACCADR is fixed to the address space of the SDRAM.

In FIG. 10, which illustrates a case where the address bit A16 (external terminal) is "1" in the third mode (fourth address generation form), up to the bit 16 of the internal address signal ACCADR can be specified by the external address terminals 303, with the upper bits 26 to 17 thereof being made specifiable by 10 bits of the supplementary information CMPL of the supplementary register 401, and the uppermost bits 31 to 27 indicating the mapping address of the SDRAM. In this case, the continuous space of the SDRAM accessible by the 16 bits of A16 to A0 of the external address terminals 304 and the 10 bits of the supplementary register 401 become 128 MBytes.

The case where the address bit A16 (external terminal) is "0" in the third mode (fifth address generation form) is assumed to be basically the same as the third address generation form because supplement is not performed by the address supplement register, and thus illustration thereof is omitted.

FIG. 11 illustrates the details of the sixth address generation form in the fourth mode. When generating an address signal in the fourth mode, the lower 16 bits are set as the inputs AD15 to AD0 from the multiplex terminals 303, and the upper 15 bits are set as the 15-Bit supplementary information CMPL of the supplementary register 401, without using the address terminals 304. In this occasion, the continuous address space by the multiplex terminals 303 is assumed to be 128 KBytes.

The following operational effect is realized according to the address conversion by the above-mentioned address control circuit.

(1) Because the supplementary information that has been set in the supplementary register supplements the upper portion of the address information that has been input from the external terminals, a space wider than an address range determined by the number of bits of the external terminals can be accessed by external terminals of a reduced number of bits.

(2) Because the address information can be supplemented using supplementary information which has been preliminarily set in the supplementary register, and because no processing is required in that case such as generating information to be supplemented by decoding some of the external terminals, delay of the address generation operation is small.

(3) Because the generation form of the address information can be determined using address information from the external terminals according to the setting of the mode register and the required supplementary information, many variations for the address generation form can be easily acquired by a small number of external terminals.

(4) In the first address generation form of the first mode, the upper 5 bits of the internal address signal ACCADR are supplemented using the supplementary register 401, whereas other address bits are generated according to the input from the external terminals 303 and 304. Therefore, the address-dedicated terminals 304 require 10-Bit coupling. By using the address supplement register, the base band processor 3 can access the entire region of the internal address space of the application processor 2. The address space continuously accessible by only the external terminals 303 and 304 extends to 128 MBytes.

(5) In the second address generation form and the third address generation form of the second mode, the internal address signal ACCADR is generated using the result of hardware-decoding a part of the input from the external terminals 303 and 304, without using the supplement by the supplementary register 401. The address-dedicated terminals 304 require 10-Bit coupling. Because the result of hard-decoding a part of the input from the external terminals 303 and 304 is used, a particular resource can be accessed by only the address information from the external terminals without using the register supplement. The SDRAM address space continuously accessible by only the external terminals 303 and 304 is 64 MBytes.

(6) In the fourth address generation form and the fifth address generation form of the third mode, the middle 10 bits of the address are generated by register supplement when accessing the SDRAM space, whereas other address bits are generated by using the external terminals 304 and hardware decoding together. Therefore, the address-dedicated terminals 304 require 1-Bit coupling only. With fixed hard decoding, the base band processor 3 can access a particular resource such as the control register of the application processor 2 using the multiplex terminals 303. For the SDRAM, a 128 MByte region can be accessed using the supplementary register 401, the continuous access space to the SDRAM by the input of the address information from the multiplex terminals 303 becomes 128 KBytes.

(7) In the sixth address generation form of the fourth mode, because the upper 15 bits of the address are supplemented by the supplementary information CMPL of the supplementary register 401, whereas other addresses are generated using the multiplex terminals 303, it is not necessary to couple address-dedicated address terminals 304. By using the address supplement register, the base band processor 3 can access the entire region of the internal address space of the application processor 2. The continuous space accessible by only the multiplex terminals 303 is 128 KBytes.

<<Address Increment for Supplementary Register>>

The fourth address generation form has a smaller continuous access space of 128 KBytes using external terminals than the second address generation form and similarly, the sixth address generation form has a smaller continuous access space of 128 KBytes using external terminals than the first address generation form. When continuously accessing in a larger address range than the above, an operation must be performed to rewrite the value of the supplementary register 401 via a register access thereto each time the address input from the external terminal goes around. In order to eliminate the necessity of this rewrite operation, an address increment function to the supplementary register 401 can be employed.

Figure 12:
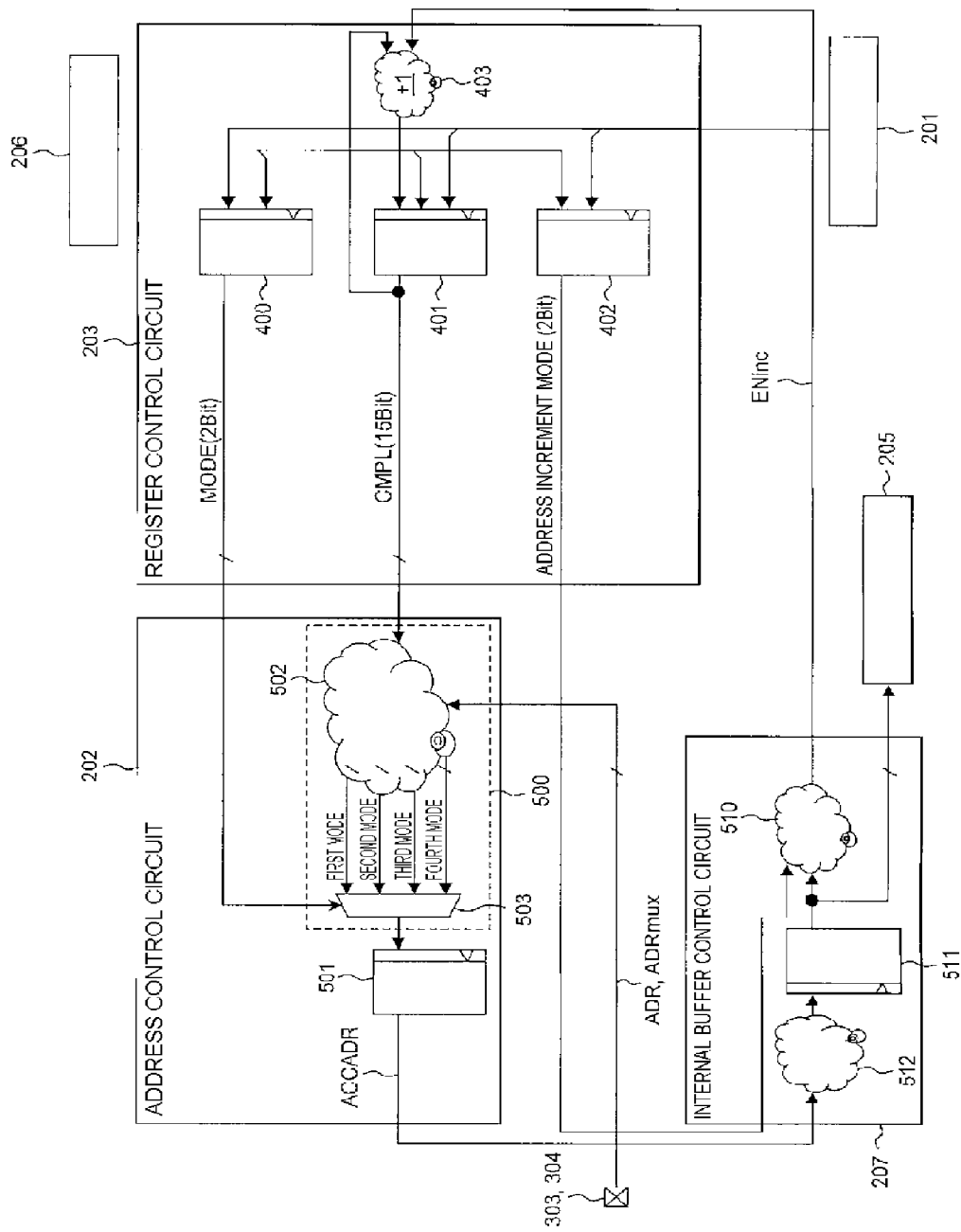
FIG. 12 is a block diagram illustrating a configuration having an address increment function added to the address conversion function.

FIG. 12 illustrates a configuration having an address increment function added to the address conversion function. The incrementer 403 which increments the supplementary information CMPL of the supplementary register 401 and the address increment mode register 402 are provided to the configuration of FIG. 1, and the internal buffer control circuit 207 has the address increment control logic 510. The internal buffer control circuit 207 latches the internal address signal ACCADR supplied from the address control circuit 202 to a buffer control logic 512 and an address buffer 511, and outputs the internal address signal ACCADR to the bus control circuit 205 in synchronization with a required output timing. According to an address increment mode specified by the address increment mode register 402, the address increment control circuit 510 instructs an increment operation to the incrementer 403 with an increment enable signal ENinc each time a value expressed by the number of bits of the address information from the multiplex terminals 303 to be supplemented by the supplementary register reaches the last value immediately before the value goes around.

Although not particularly limited, the address increment mode is defined as: non-use of address increment, a 16-Byte address increment correspondence mode, or a 32-Byte address increment correspondence mode. Because of importance of existence of the address increment function, non-use of address increment is set except for the fourth address generation form and the sixth address generation form. When the 16-Byte address increment correspondence mode is set, the address increment control circuit 510 instructs an increment operation to the incrementer 403 in response to that the values of the address information AD15 to AD0 from the external input terminals 303 according to the 16-Byte address increment mode in which the address information AD15 to AD0 from the external input terminals 303 is varied in units of 16-Byte addresses is set to the last value immediately before the final value ("FFF0" in hexadecimal format) expressed by the number of bits (16 bits) of the address information. When the 32-Byte address increment correspondence mode is set, the address increment control circuit 510 instructs an increment operation to the incrementer 403 in response to that the values of the address information AD15 to AD0 from the external input terminals 303 according to the 32-Byte address increment mode in which the address information AD15 to AD0 from the external input terminals 303 is varied in units of 32-Byte addresses is set to the last value immediately before the final value ("FFE0" in hexadecimal format) expressed by the number of bits (16 bits) of the address information.

Accordingly, it becomes possible for the base band processor 3 to continuously access a region that can be specified in the range of up to the sum of the available 16 bits of the external terminals 303 and the number of bits of the supplementary register (10 bits in the case of the fourth address generation form, 15 bits in the case of the sixth address generation form), without having to rewrite the value of the supplementary register 401 of the application processor 2 each time the address information AD15 to AD0 input from the multiplex terminals 303 goes around. Therefore, it becomes possible to continuously access an address range similar to that of the second address generation form even if the external terminals to be used for transmitting address information between the base band processor 3 and the application processor 2 are limited to the multiplex terminals 303. In other words, although the address space of the SDRAM which can be continuously expressed using the external terminals in the fourth address generation form in the third mode is 128 KBytes when the address increment mode is not used, it is increased to 128 MBytes when the address increment mode is used. Similarly, although the address space of the SDRAM which can be continuously expressed using the external terminals in the sixth address generation form in the fourth mode is 128 KBytes when the address increment mode is not used, it can be increased to 128 MBytes or more when the address increment mode is used. Although the continuously accessible SDRAM address space is expanded to 128 MBytes, because, in the fourth address generation form, the address supplementary register 401 uses the 17th to 26th bits of the internal address signal, the continuously accessible SDRAM address space is expanded to 128 MBytes or more because, in the sixth address generation form, the address supplementary register is applied to all the remaining uppers bits of the 17th to 31st bits of the internal address signal. In the address increment mode, an address conversion mode which applies the address supplementary register is available because the address supplementary register is to be incremented.

By employing the address increment function to the supplementary register 401, it is possible to support a case having a bus control function for a burst operation of the 16-Byte address increment mode in which the base band processor 3 issues an access request in units of 16-Byte addresses and the bus controllers 11 and 12 of the application processor 2 receiving the request internally generate a 16-Byte address with the access request address being the base point , or a case similarly having a bus control function for a burst operation of the 32-Byte address increment mode.

Because the increment mode of the incrementer can be set by the address increment mode register 402, it becomes very easy to support the 16-Byte address increment mode or the 32-Byte address increment mode.

<<Example of Access using Address Conversion Mode>>

Figure 13:
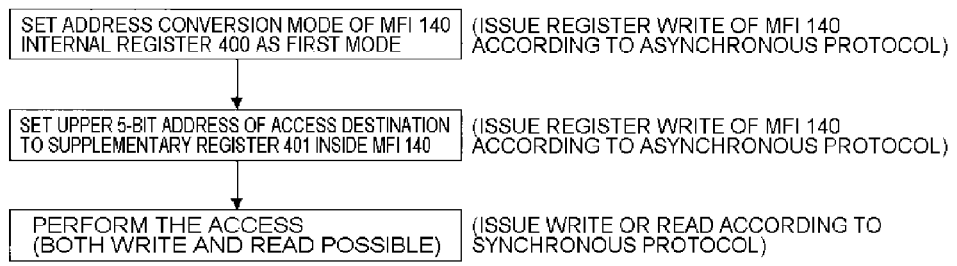
FIG. 13 is a flow chart illustrating an example of access to the application processor using the first mode.

FIG. 13 illustrates an example of access to the application processor 2 using the first mode. For example, a case of accessing an address 0x__41231234 (*1) in the address space of the application processor 2 is illustrated. 0x__4******* is assumed to be the address space of the SDRAM.

First, the base band processor 3 writes "0x__4000" into the bits 31 to 16 of the supplementary register 401 of an MFI 140.

The base band processor 3 issues an access to output an address of "0x__0091891a" ("0x__0091891a", being a 2-Byte boundary address, results from shifting "0x__01231234" to the right by one bit). In other words, the base band processor issues in its address phase an access by outputting AD[15:0] ="1000100100011010" to the multiplex terminals 303 and outputting A[25:16]="0010010001" to the address terminals 304. AD[15:0] is an internal address [16:1] of the internal address signal ACCADR, and A[25:16] is an internal address [26:17] of the internal address signal ACCADR.

Figure 14:
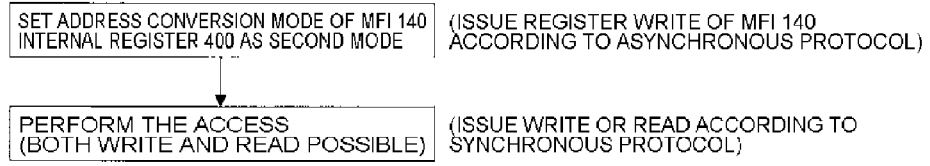
FIG. 14 is a flow chart illustrating an example of access to the application processor using the second mode.

FIG. 14 illustrates an example of access to the application processor 2 using the second mode. For example, a case of accessing an address 0x__41231234 in the address space of the application processor 2 is illustrated. 0x__4******* is assumed to be the address space of the SDRAM.

First, the base band processor 3 issues an access to output an address of "0x__0091891a" ("0x__0091891a", being a 2-Byte boundary address, results from shifting "0x__01231234" to the right by one bit). In other words, the base band processor 3 issues in its address phase an access by outputting AD[15:0]="1000100100011010" to the multiplex terminals 303 and outputting A[25]="1", A[24:16]="010010001" to the address terminals 304. AD[15:0] is an internal address [16:1] of the internal address signal ACCADR, and A[24:16] is an internal address [25:17] of the internal address signal ACCADR. Here, because the access destination is the SDRAM space, it is necessary to set the A[25] terminal to "1".

Figure 15:
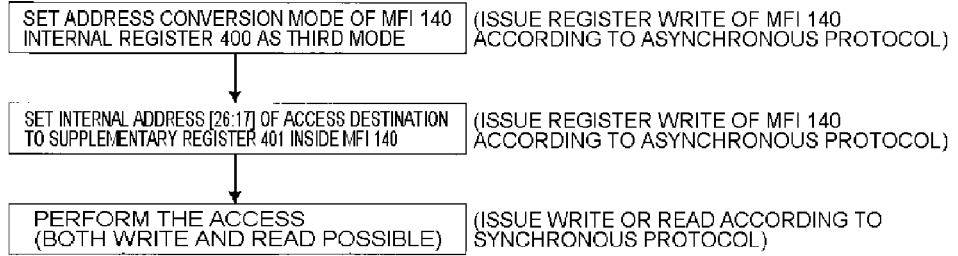
FIG. 15 is a flow chart illustrating an example of access to the application processor using the third mode.

FIG. 15 illustrates an example of access to the application processor 2 using the third mode. For example, a case of accessing an address 0x__41231234 in the address space of the application processor 2 is illustrated. 0x__4******* is assumed to be the address space of the SDRAM.

First the base band processor 3 writes "0x__0122" into the bits 31 to 16 of the supplementary register 401 of the MFI 140. Because the bits to be supplemented are [26:17] of the internal address signal ACCADR, "0x__0122" is written from "0x__4123" of the upper address of the access destination.

The base band processor 3 issues an access to output an address of "0x__891a" (the above mentioned "0x891a", being a 2-Byte boundary address, results from shifting "0x31234" to the right by one bit and deleting the bits [19:16]). In other words, the base band processor 3 issues in its address phase an access by outputting AD[15:0]="1000100100011010" to the multiplex terminals 303 and outputting A[16]="1" to the address terminals 304. AD[15:0] is [16:1] of the internal address signal ACCADR. [26:17] of the internal address signal ACCADR corresponds .to the bits [26:17] of the supplementary register. Here, because the access destination is the SDRAM space, it is necessary to set the A[16] terminal to "1".

Figure 16:
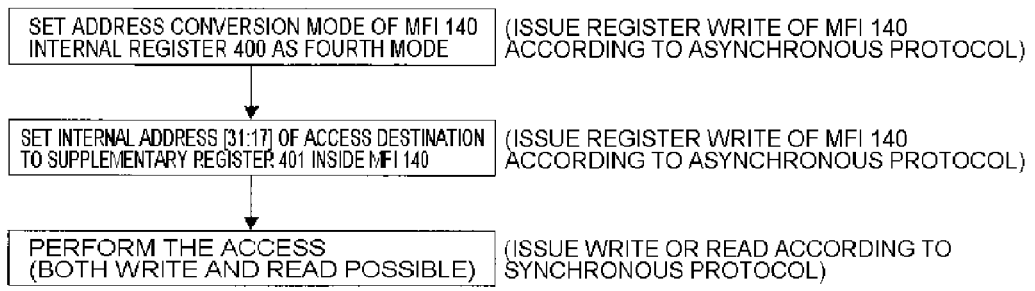
FIG. 16 is a flow chart illustrating an example of access to the application processor using the fourth mode.

FIG. 16 illustrates an example of access to the application processor 2 using the fourth mode. For example, a case of accessing an address 0x__41231234 in the address space of the application processor 2 is illustrated. 0x__4******* is assumed to be the address space of the SDRAM.

First, the base band processor 3 writes "0x4122" into the bits 31 to 16 of the supplementary register 401 of the MFI 140 (Because the bits to be supplemented are [31:17] of the internal address signal ACCADR, "0x__4122" is written from "0x__4123" of the upper address of the access destination).

The base band processor 3 issues an access to output an address of "0x891a" (the above mentioned "0x__891a", being a 2-Byte boundary address, results from shifting "0x31234" to the right by one bit and deleting the bits [19:16]). In other words, the base band processor 3 issues in its address phase an access to the multiplex terminals 303 with AD[15:0] ="1000100100011010". AD[15:0] is the internal address signal ACCADR [16:1] . The internal address [31:17] corresponds to the bits [31:17] of the supplementary register 401.

<<External Input Operation Timing of Address Conversion Circuit>>

Figure 17:
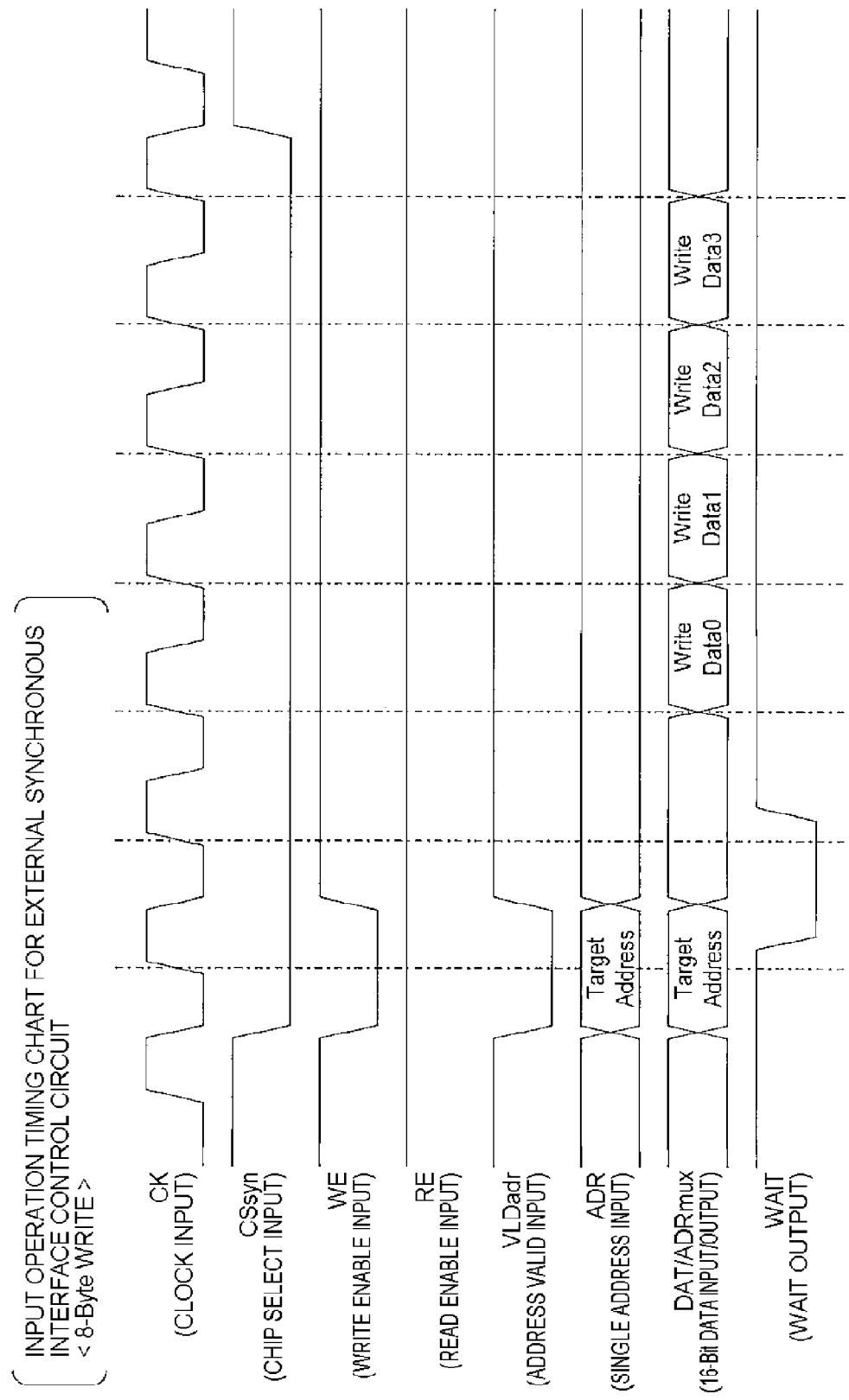
FIG. 17 is a timing chart of a write operation on an external synchronous interface control circuit.

FIG. 17 illustrates a timing chart of a write operation into the external synchronous interface control circuit 200. A clock signal CK, a write enable signal WE, and a read enable signal RE are signals included, together with an address valid signal VLDadr, in a bus control signal CTL. FIG. 17 illustrates an 8-Byte write operation. With regard to the address input, a case is illustrated where an address signal ADR from the address terminals 304 and an address signal ADRmux from the multiplex terminals 303 are input in parallel. Here, a case of continuously inputting write data for burst write is illustrated. In the case of burst write into the SDRAM 9, for example, a bus controller 11 provided therefor sequentially generates burst write addresses subsequent to the Target Address.

Figure 18:
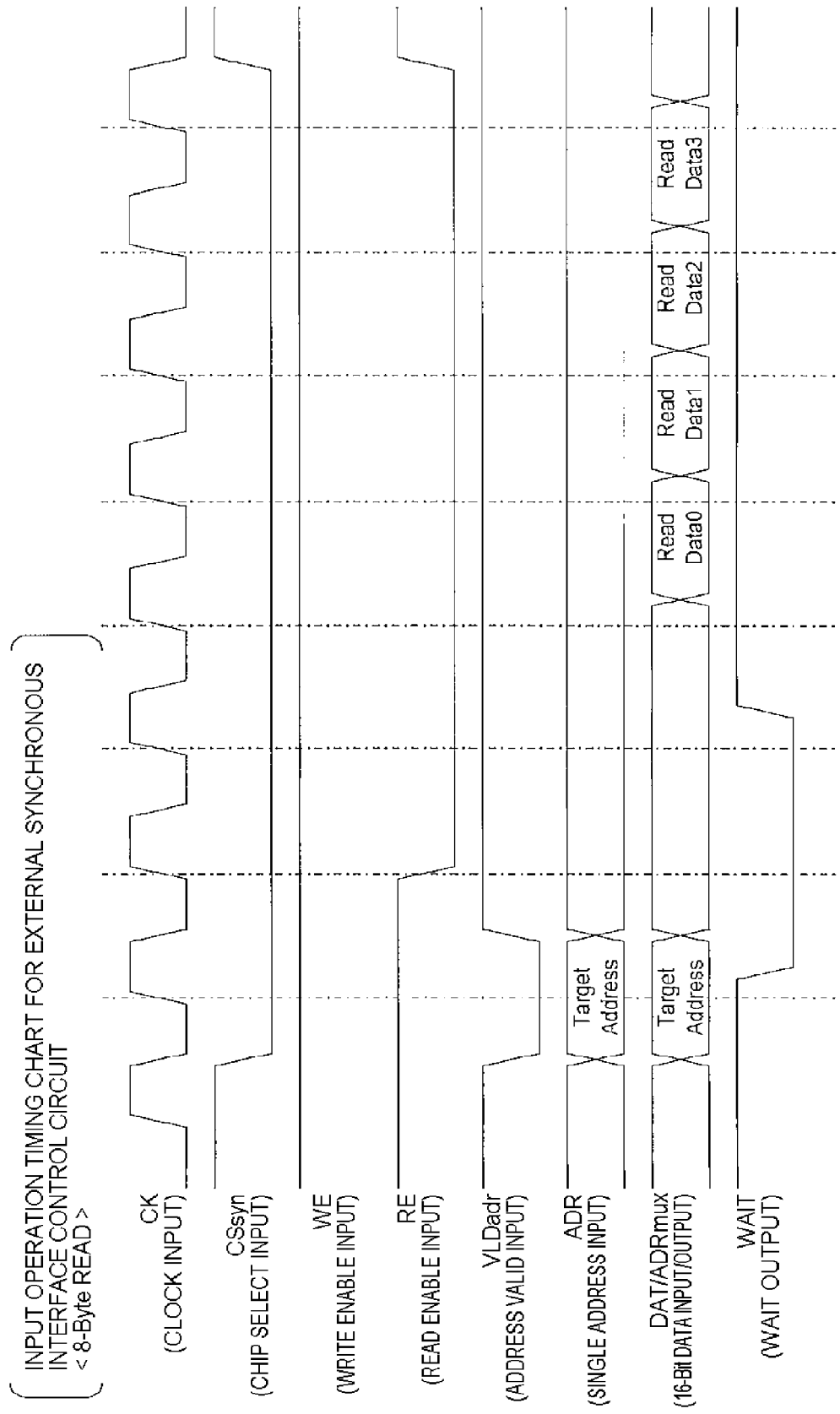
FIG. 18 is a timing chart of a read operation on an external synchronous interface control circuit.

FIG. 18 illustrates a timing chart of a read operation from the external synchronous interface control circuit 200. The input signal is of the same type as that of FIG. 17, and an example is shown where read data is continuously acquired by a burst read operation. In the case of burst read from the SDRAM 9, for example, the bus controller 11 provided therefor sequentially generates burst read addresses subsequent to the Target Address.

Figure 19:
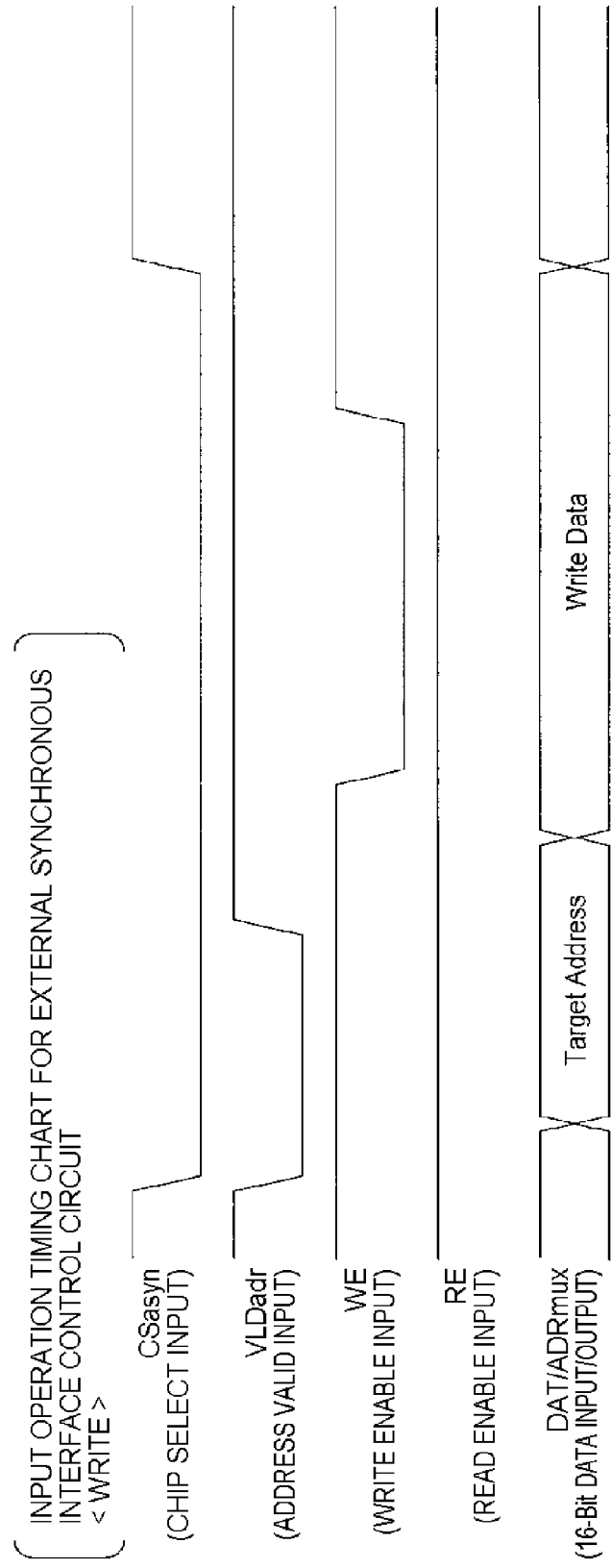
FIG. 19 is a timing chart of a write operation on an external asynchronous interface control circuit.

FIG. 19 illustrates a timing chart of a write operation into the external asynchronous interface control circuit 201. The clock signal CK is not used, and the address input is assumed to be the address signal ADRmux from the multiplex terminals 303. Here, an example of single write into the Target Address is shown.

FIG. 20 illustrates a timing chart of a read operation from the external asynchronous interface control circuit 201. The clock signal CK is not used, and the address input is assumed to be the address signal ADRmux from the multiplex terminals 303. Here, an example of single read from the Target Address is shown.

Although the present invention made by the inventors has been specifically described above based on embodiments, it is needless to say that the invention is not limited thereto and can be modified in various ways without deviating from the spirit thereof.

For example, the number of external terminals of a chip need not be identical to the number of external terminals of the package and, for a semiconductor device using only a particular operation mode, the external terminals of the package may be some of the external terminals of the chip.

The present invention can be widely applied to data processing semiconductor devices other than application processors.

The present invention can be widely applied to data processing systems other than cellular phone devices. Although, in the above-mentioned embodiments, an external interface circuit has been described in which a base band processor working as a master processor directly accesses the address space of an application processor working as a slave processor, the present invention can be naturally applied to an external interface circuit in which the slave side directly accesses the address space of the master side.

The number of bits of the internal address signal, the number of bits of various registers such as supplementary registers, the number of multiprocessors, the number or type of accelerators can be varied as appropriate.

What is claimed is:

1. A data processing system comprising:
a first data processor;
a memory device provided in a part of an address space of the first data processor and coupled to an outside of the first data processor; and
a second data processor coupled to an outside of the first data processor,
wherein the first data processor includes:
a first external interface circuit which controls access to the address space of the first data processor from the second data processor; and
a second external interface circuit which controls access to the memory device,
wherein the first external interface circuit includes:
an external terminal arrangement for inputting, from the second data processor, a part of an address signal used to access the address space;
a supplementary register in which supplementary information for supplementing an upper portion of an address information that has been input from the external terminal arrangement is written by the second data processor;
a mode register in which mode information is written by the second data processor; and
an address control circuit which generates an address signal to access the address space of the first data processor in a form based on information input from the external terminal arrangement, the supplementary register, and the mode register, and
wherein the second data processor, after setting the mode register and the supplementary register, outputs address information to the external terminal to issue read access or write access.

2. The data processing system according to claim 1, wherein the form of the address signal generated by the address control circuit includes a first generation form which supplements the address information input from the external terminal arrangement with the supplementary information of the supplementary register.

3. The data processing system according to claim 2, wherein the external terminal arrangement includes an external multiplex terminal and an address input terminal used for address input or data input/output in a switching manner, and inputs, in the first generation form, address information using both the address input terminal and the external multiplex terminal.

4. The data processing system according to claim 1, wherein the form of the address signal generated by the address control circuit includes a second generation form in which, when particular bits of the address information input from the external terminal arrangement are a first value, the address information from the external terminal arrangement excluding the particular bits is defined as a lower portion and the upper portion is defined as a default value assigned to an address of a particular resource, and a third generation form in which, when particular bits of the address information input from the external terminal arrangement are a second value, a predetermined bit string of the address information from the external terminal arrangement is defined as the lower portion and the upper portion is defined as a default value assigned to an address of a resource corresponding to a value of another particular bit array of the information input from the external terminal arrangement.

5. The data processing system according to claim 4, wherein the particular resource is the memory device, and the resource corresponding to the value of the particular bit array is a group of registers built in the first data processor.

6. The data processing system according to claim 4, wherein:
the external terminal arrangement includes an external multiplex terminal and an address input terminal used for address input or data input/output in a switching manner;
all bits of both the address input terminal and the external multiplex terminal are used to input information in the second generation form and the third generation form; and
the predetermined bit string and the another particular bit array are input from the external multiplex terminal.

7. The data processing system according to claim 1, wherein the form of the address signal generated by the address control circuit includes:
a fourth generation form in which, when particular bits of the address information input from the external terminal arrangement are a first value, the address information from the external terminal arrangement excluding the particular bits is defined as a lower portion and the upper portion is defined as the supplementary information held in the supplementary register with the upper portion further defined as a default value assigned to an address of a particular resource; and
a fifth generation form in which, when particular bits of the address information input from the external terminal arrangement are a second value, a predetermined bit string of information from the external terminal arrangement is defined as the lower portion and the upper portion is defined as a default value assigned to an address of a resource corresponding to a value of another particular bit array of the information input from the external terminal arrangement.

8. The data processing system according to claim 7, wherein the particular resource is the memory device, and the resource corresponding to the value of the particular bit array is a group of registers built in the first data processor.

9. The data processing system according to claim 7, wherein the external terminal arrangement includes an external multiplex terminal and an address input terminal used for address input or data input/output in a switching manner, and
wherein one bit of the address input terminal and all bits of the external multiplex terminal are used to input information in the fourth generation form and the fifth generation form; and
the predetermined bit string and the another particular bit array are input from the external multiplex terminal.

10. The data processing system according to claim 9, further comprising:
an incrementer which increments the supplementary information of the supplementary register; and
an address increment control circuit which provides the incrementer with an instruction of an increment operation each time a value expressed by the number of bits of the address information from the external multiplex terminal to be supplemented by the supplementary register in the fourth generation form reaches a last value immediately before the value goes around.

11. The data processing system according to claim 10, wherein the address increment control circuit issues the instruction of an increment operation in response to the value of the address information from the external terminal arrangement being set to the last value immediately before a final value expressed by the number of bits of the address information according to a multibyte address increment mode in which the address information from the external terminal arrangement is varied in units of multibyte addresses.

12. The data processing system according to claim 11, further comprising:
an address increment mode register which specifies a type of the address increment mode,
wherein the address increment control circuit switches, according to the type specified in the address increment mode register, the final value when instructing an address increment operation.

13. The data processing system according to claim 2, wherein the form of the address signal generated by the address control circuit includes a sixth generation form in which the address information input from terminals of the external terminal arrangement with a smaller number of bits than that used in the first generation form is supplemented by supplementary information of the supplementary register having a larger number of bits than that used in the first generation form.

14. The data processing system according to claim 13, wherein the external terminal arrangement to which the address information is input in the sixth generation form includes an external multiplex terminal used for address input or data input/output in a switching manner.

15. The data processing system according to claim 14, further comprising:
an incrementer which increments a value of the supplementary register; and
an address increment control circuit which provides the incrementer with an instruction of an increment operation each time a value expressed by the number of bits of the address information from the external multiplex terminal to be supplemented by the supplementary register in the sixth generation form reaches a last value immediately before the value goes around.

16. The data processing system according to claim 15, wherein the address increment control circuit issues the instruction of an increment operation in response to the value of the address information from the external terminal arrangement being set to the last value immediately before a final value expressed by the number of bits of the address information according to a multibyte address increment mode in which the address information from the external terminal arrangement is varied in units of multibyte addresses.

17. The data processing system according to claim 16, further comprising:
an address increment mode register which specifies a type of the address increment mode,
wherein the address increment control circuit switches, according to the type specified in the address increment mode register, the final value when instructing an address increment operation.

* * * * *